United States Patent [19]

Kawachi et al.

[11] Patent Number: 4,841,776
[45] Date of Patent: Jun. 27, 1989

[54] DIFFERENTIAL PRESSURE TRANSMITTER

[75] Inventors: Junji Kawachi; Shunichiro Awa; Keizo Ohtani, all of Tokyo, Japan

[73] Assignee: Yamatake-Honeywell Co., Ltd., Tokyo, Japan

[21] Appl. No.: 68,541

[22] Filed: Jun. 29, 1987

[30] Foreign Application Priority Data

Jun. 30, 1986 [JP] Japan .................. 61-153076

[51] Int. Cl.⁴ .................. G01L 7/08; G01L 9/00; G01L 13/02; G01L 15/00
[52] U.S. Cl. .................. 73/706; 73/717; 73/756; 73/861.47
[58] Field of Search .............. 73/861.47, 861.48, 182, 73/706, 708, 717, 718, 719, 720, 721, 722, 756

[56] References Cited

U.S. PATENT DOCUMENTS 1,018,561 2/1912 Hitchcock .................. 73/861.47
4,347,745 9/1982 Singh .................. 73/721

FOREIGN PATENT DOCUMENTS 0139633 8/1982 Japan .................. 73/718

Primary Examiner—Donald O. Woodiel
Attorney, Agent, or Firm—Blakely, Sokoloff, Taylor & Zafman

[57] ABSTRACT

In a differential pressure transmitter, the respective measurement pressures are applied to a pair of barrier diaphragms respectively disposed on both side surfaces of a body, and movement of a sealed liquid caused by a differential pressure thereof is extracted as an electrical output by a differential pressure measuring pressure sensor provided by partitioning a sealing circuit. A sensor housing is manufactured independently of the body. The differential pressure measuring pressure sensor and a static pressure measuring pressure sensor for measuring a static pressure when applied with a measurement pressure applied to one of the pair of barrier diaphragms and a reference pressure such as an atmospheric pressure, are disposed in the housing. The housing is fixed to a housing mount portion of the body.

2 Claims, 3 Drawing Sheets

DIFFERENTIAL PRESSURE TRANSMITTER

BACKGROUND OF THE INVENTION

The present invention relates to a differential pressure transmitter which can measure a pressure difference between two points as a process variate and simultaneously measure a high or low static pressure.

In order to measure, e.g., a flow rate of a fluid in a pipe, an orifice plate is disposed in the pipe to produce a fluid resistance, and a pressure difference between the upstream and downstream sides of the orifice plate is measured to calculate the flow rate on the basis of a predetermined calculation. A differential pressure transmitter used for differential pressure measurement of this type is arranged such that the respective measurement pressures are supplied to high- and low-pressure barrier diaphragms, and movement of a sealed liquid caused by the pressure difference at that time is extracted as an electrical output in accordance with strain of a pressure sensor disposed by partitioning a sealing circuit. In addition, a differential pressure transmitter of this type is required to measure a small differential pressure under a high static pressure (e.g., plant reaction, boiler internal, and water supply pressures). However, a differential pressure measuring pressure sensor is generally affected by a static pressure and hence cannot perform differential pressure measurement with high accuracy under the high static pressure. For this reason, in a known apparatus, a static pressure measuring pressure sensor is incorporated in a differential pressure transmitter used under the high static pressure so that a zero-point change caused by a static pressure change is compensated. An example is a "differential pressure detector" disclosed in Japanese Patent Laid-Open (Kokai) No. 54-67480.

In this detector, as shown in FIG. 4, two strain resistance elements 3a and 3b of a static pressure measuring pressure sensitive element (sensor) 3 are respectively connected to a bridge circuit 1 and an operational amplifier 2 to control inputs thereof. The resistance element 3a determines a resistance change caused by a static pressure change so as to compensate for a zero-point change caused by the static pressure change, and the other resistance element 3b determines a resistance change caused by the static pressure change so as to compensate for a span change caused by the static pressure change and controls the input of the operational amplifier 2, thereby measuring a differential pressure with high accuracy. Note that in FIG. 4, reference symbols A and B denote differential pressure output terminals, and reference numeral 4 denotes a differential pressure detecting pressure sensitive element (sensor); 4a and 4b. strain resistance elements of the sensor 4; 5, a fixed resistor; 6, a power source; 7, a fixed resistor; and 8, a voltage/current converter.

However, according to either of the conventional differential pressure transmitter incorporating a static pressure measuring pressure sensor therein and the above-mentioned differential pressure detector (Japanese Patent Laid-Open (Kokai) No. 54-67480), a differential pressure measuring pressure sensor and a static pressure measuring pressure sensor are incorporated in a body having a barrier diaphragm, resulting in a complex body structure, cumbersome manufacture and assembly, and high cost. In addition, since a structure of a body incorporating a static pressure measuring pressure sensor and that of a body not incorporating it are apparently different from each other, two types of body must be manufactured, so that types of body are increased and hence parts control becomes troublesome. Furthermore, even when only one of the sensors malfunctions, the entire body need be replaced, resulting in an economical disadvantage.

SUMMARY OF THE INVENTION

It is, therefore, a principal object of the present invention to provide a differential pressure transmitter which has a simple body structure and hence can be easily manufactured.

It is another object of the present invention to provide a differential pressure transmitter in which a transmitter body can be used in common for both pressure difference and static pressure measurements, thereby decreasing types of body.

It is still another object of the present invention to provide a differential pressure transmitter in which parts replacement and maintenance can be easily performed, resulting in low cost.

In order to achieve the above objects of the present invention, there is provided a differential pressure transmitter in which the respective measurement pressures are applied to a pair of barrier diaphragms respectively disposed on both side surfaces of a body, and movement of a sealed liquid caused by a differential pressure thereof is extracted as an electrical output by a differential pressure measuring pressure sensor provided by partitioning a sealing circuit, wherein a sensor housing is manufactured independently of the body, the differential pressure measuring pressure sensor and a static pressure measuring pressure sensor for measuring a static pressure when applied with a measurement pressure applied to one of the pair of barrier diaphragms and a reference pressure such as an atmospheric pressure, are disposed in the housing, and the housing is fixed to a housing mount portion of the body.

DESCRIPTION OF THE PREFERRED EMBODIMENTS

The present invention will be described in detail with reference to embodiments shown in the accompanying drawings.

Figure 1:
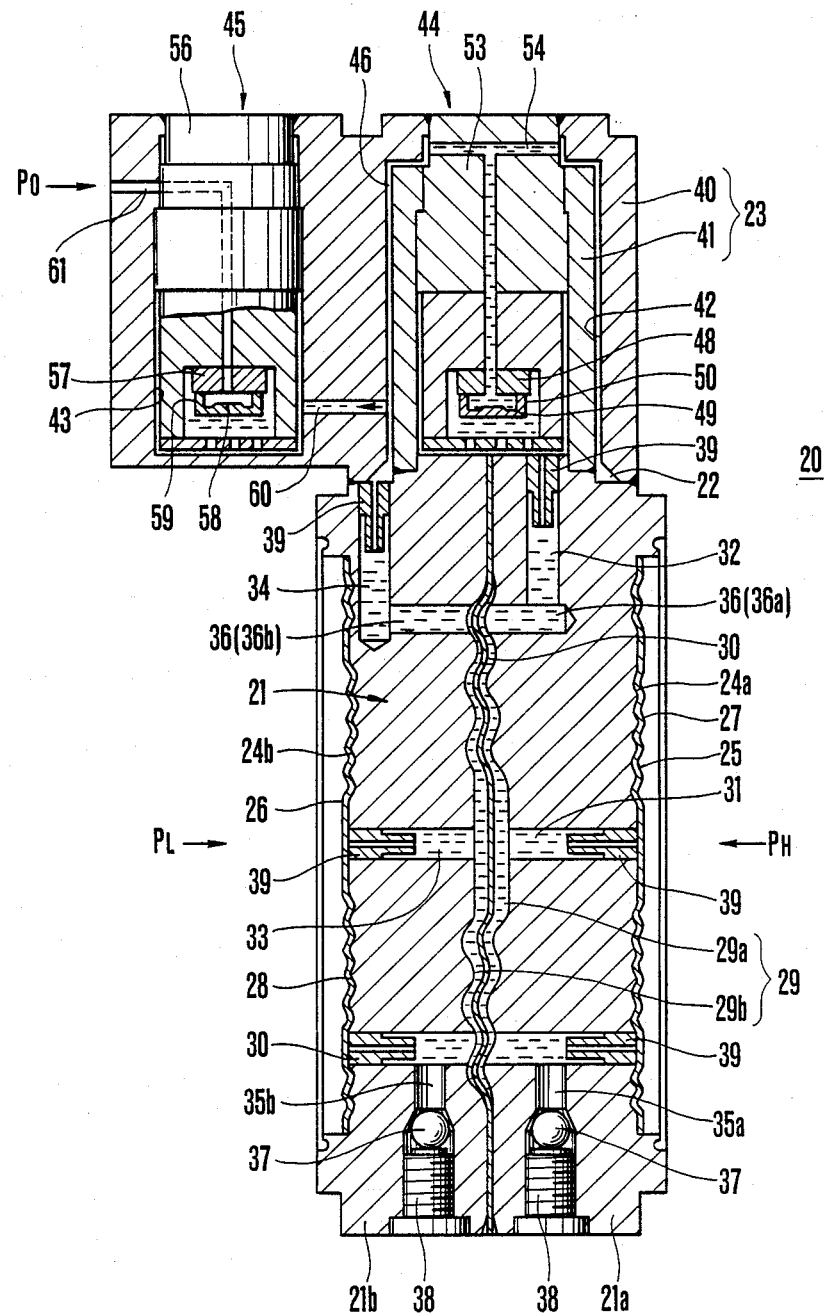
FIG. 1 is a longitudinal sectional view of an embodiment of a differential pressure transmitter according to the present invention.

FIG. 1 shows an embodiment of a differential pressure transmitter according to the present invention. In FIG. 1, a differential pressure transmitter, an entire arrangement of which is denoted by reference numeral 20, is constituted by a disk-like body 21 formed by integrally coupling two plates 21a and 21b and a sensor housing 23 fixed on the upper surface of the body 21, i.e., a housing mount portion 22 by, e.g., welding so as to constitute a neck portion of the transmitter 20.

The body 21 is formed by, e.g., stainless steel, and wave-shaped disk-like high-pressure and low-pressure barrier diaphragms 25 and 26 are respectively disposed on both side surfaces of the body 21, i.e., pressure receiving side surfaces 24a and 24b so that their edges are fixed thereon. The pressure receiving side surfaces 24a and 24b are respectively formed to have the same waveshapes as those of the barrier diaphragms 25 and 26, and form rear chambers 27 and 28 together with the barrier diaphragms 25 and 26, respectively. A high pressure $P_H$ on the upstream side of the orifice and a low pressure $P_L$ on the downstream thereof are respectively applied to outer surfaces of the barrier diaphragms 25 and 26.

A body chamber 29 is formed at a central portion inside the body 21 and partitioned into right and left chambers 29a and 29b by a central diaphragm 30. The chamber 29a communicates with the high-pressure rear chamber 27 through a communication path 31, and the other chamber 29b communicates with the low-pressure rear chamber 28 through a communication path 33. A pair of sealing circuits 32 and 34 are formed at an upper portion inside the body 21 so that ends thereof communicate with the chambers 29a and 29b, respectively, and the other ends thereof are open at the housing mount portion 22. A pair of liquid sealing apertures 35a and 35b are formed at a lower portion inside the body 21, and noncompressive liquids 36 (36a and 36b) are sealed into the rear chambers 27 and 28, the body chamber 29, the communication paths 31 and 33, and the sealing circuits 32 and 34 respectively through the apertures 35a and 35b. Note that each of the apertures 35a and 35b is sealed by a ball 37 and a set screw 38 after the liquid is sealed. Each reference numeral 39 denotes a choke pipe.

The sensor housing 23 is constituted by an outer cylinder 40 having two sensor housing recesses 42 and 43 and formed by, e.g., stainless steel, a differential pressure measuring pressure sensor 44 housed in the sensor housing recess 42 through an inner cylinder 41, and a static pressure measuring pressure sensor 45 housed in the other sensor housing recess 43. The outer cylinder 40 is fixed to the body 21 so that a lower surface opening portion of the sensor housing recess 42 corresponds to the housing mount portion 22 of the body 21 at the lower surface of the outer cylinder 40. The inner cylinder 41 is fixed to the housing mount portion 22 at its lower end and forms a gap path 46 communicating with the low-pressure sealing circuit 34 together with an inner wall of the sensor housing recess 42. The interior of the inner cylinder 41 communicates with the high-pressure sealing circuit 32. The differential pressure measuring pressure sensor 44 is a conventionally known sensor including a silicon base 48, a cup-like silicon wafer 50, a bottom surface of which constitutes a semiconductor diaphragm 49 and is fixed on the lower surface of the silicon base 48, a strain gage (which corresponds to the strain resistance elements 4a and 4b in FIG. 4) provided at a strained portion of the semiconductor diaphragm 49 by diffusion and bridge-connected thereto. The high pressure $P_H$ is applied to the outer surface of the semiconductor diaphragm 49 through the sealed liquid 36a inside the rear chamber 27, the chamber 29a, and the high-pressure sealing circuit 32, and the low pressure $P_L$ is applied to the inner surface of the semiconductor diaphragm 49 through the sealed liquid 36b inside the rear chamber 28, the chamber 29b, the low pressure sealing circuit 34, the gap path 46, and a path 54 provided in a protecting member 53 of the pressure sensor 44. The protecting member 53 is inserted in the inner cylinder 41, and its upper portion is welded to the outer and inner cylinders 40 and 41.

Figure 4:
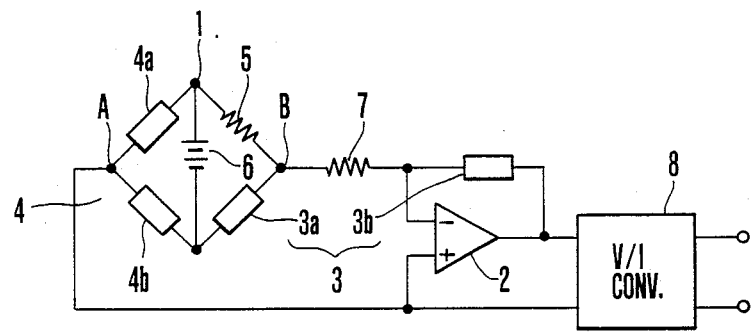
FIG. 4 is a circuit diagram of a differential pressure measuring pressure sensitive element and a static pressure measuring pressure sensitive element.

The static pressure measuring sensor 45 is manufactured in the same manner as that of the differential pressure measuring sensor 44 and is constituted by a silicon base 57 housed in a protecting member 56, a cup-like silicon wafer 59, a bottom surface of which constitutes a semiconductor diaphragm 68, a strain gage (which corresponds to the strain resistance elements 3a and 3b in FIG. 4) provided at a strained portion of the semiconductor diaphragm 58 by diffusion, and the like. The low pressure $P_L$ is applied to the outer surface of the semiconductor diaphragm 58 through the low-pressure sealed liquid 36b. For this reason, the sensor housing recess 43 and the gap path 46 communicate with each other through a communication path 60. An atmospheric pressure $P_O$ is applied as a reference pressure to the inner surface of the semiconductor diaphragm 58 through the outer cylinder 40 and a communication path 61 provided in the protecting member 56.

Note that the differential pressure measuring and static pressure measuring pressure sensors 44 and 45 are arranged in the same manner as that of a conventional electric circuit shown in FIG. 4.

In the differential pressure transmitter 20 having the above arrangement, when the high and low pressures $P_H$ and $P_L$ are applied to the barrier diaphragms 25 and 26, respectively, a differential pressure $(P_H - P_L)$ at that time is applied to the semiconductor diaphragm 49 of the differential pressure measuring pressure sensor 44. For this reason, the diaphragm 49 is deformed in accordance with the differential pressure, and its deformation amount is extracted as an electrical signal, so that the pressure sensor 44 measures the differential pressure. However, when the low pressure $P_L$ and the atmospheric pressure $P_O$ are applied to the semiconductor diaphragm 58 of the static pressure measuring pressure sensor 45, the pressure sensor 45 measures the static pressure at that time, compensates for the zero-point change caused by the static pressure change, and simultaneously corrects the differential pressure on the basis of the static pressure measurement value, thereby calculating the accurate differential pressure. This accurate differential pressure is amplified by an amplifier, and then is recorded and displayed on an instrument or remote-transmitted, thereby contributing to accurate flow speed measurement, valve control, and the like.

Figure 2:
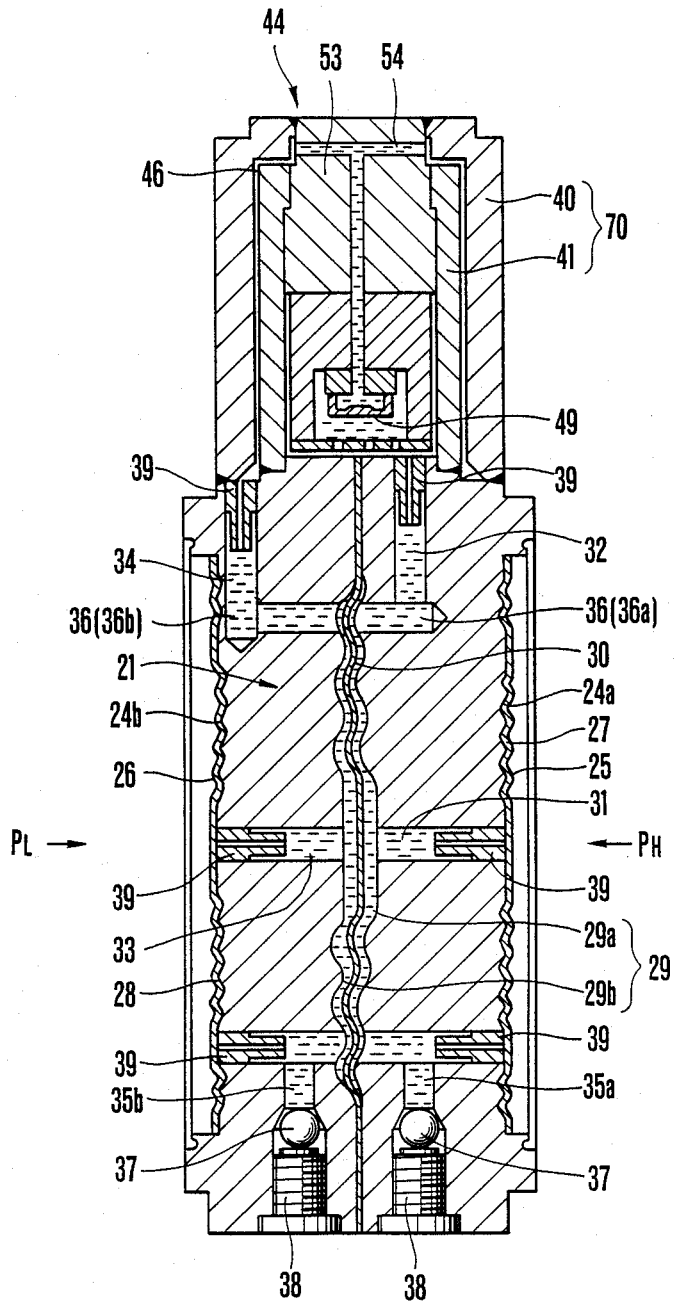
FIG. 2 is a longitudinal sectional view of a differential pressure transmitter not measuring a static pressure.

As described above, according to the differential pressure transmitter 20 having the above arrangement, since the sensor housing 23 is provided independently of the body 21, and the differential pressure measuring and static pressure measuring pressure sensors 44 and 45 are disposed therein, an internal structure of the body 21 is significantly simplified. As a result, manufacture and assembly can be easily performed at low cost. As for a transmitter not performing static pressure compensation, a sensor housing 70 incorporating only a differential pressure measuring pressure sensor instead of the sensor housing 23 incorporating both the pressure sensors 44 and 45 may be mounted in the body 21, as shown in FIG. 2. Therefore, the body 21 can be used in common to the transmitter performing static pressure compensation and that not performing it. As a result, types of body 21 can be decreased, production efficiency can be improved, and parts control can be simplified.

In addition, when the pressure sensor 44 or 45 malfunctions, only the sensor housing 23 (or 70) need be replaced, i.e., the body 21 need not be replaced, resulting in an economical advantage.

Figure 3:
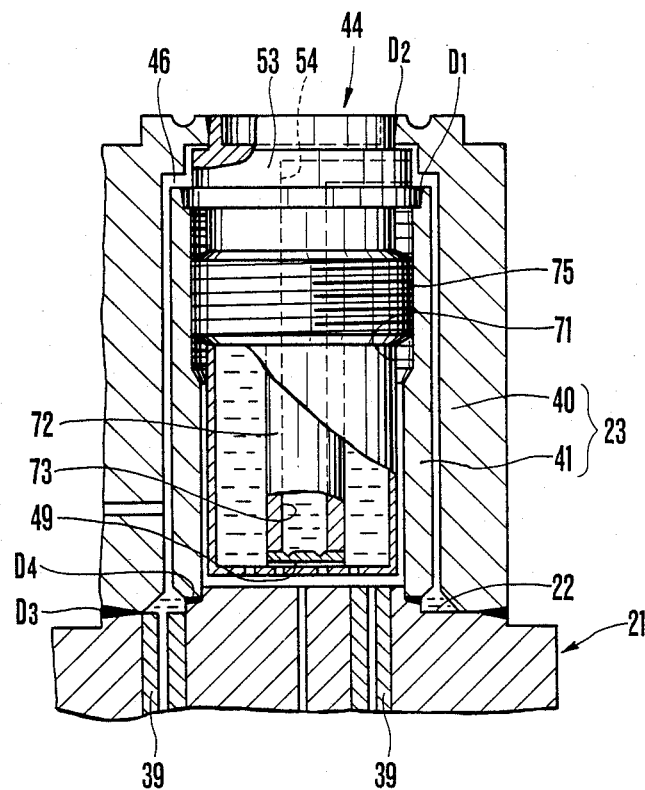
FIG. 3 is a sectional view showing the main part of another embodiment of a sensor housing.

FIG. 3 is a sectional view of another embodiment of the sensor housing 23. The housing 23 includes the outer and inner cylinders 40 and 41, and a female screw 71 is formed in an inner surface opening end portion of the inner cylinder 41. A lower end portion of the protecting member 53 of the differential pressure measuring pressure sensor 44 is cylindrically formed, and an upper end of a cylinder-like support member 72 is fixed to a central portion inside the protecting member 53. An inner aperture 73 of the support member 72 communicates with the path 54, and the semiconductor diaphragm 49 is mounted on a lower end opening portion of the support member 72 so as to close the inner aperture 73. A male screw 75 is formed on an upper end portion outer surface of the protecting member 53 to threadably engage with the female screw 71 of the inner cylinder 41, and the protecting member 53 is welded to the outer and inner cylinders 40 and 41. Note that reference numerals $D_1$ to $D_4$ denote welding portions. In addition, the static pressure measuring pressure sensor is completely the same as that of the embodiment shown in FIG. 1 and hence is not shown in FIG. 3.

In order to mount the differential pressure measuring sensor 44, the inner cylinder 41 is first welded (at the portion $D_4$) to the housing mount portion 22 of the body 21, and then the protecting member 53 is threadably inserted in the inner cylinder 41 and welded thereto (at the portion $D_1$). After the inner cylinder 41 is closed, the outer cylinder 40 is fitted on the outer surface of the inner cylinder 41 and welded (at the portion $D_3$) to the housing mount portion 22, and then the upper surface side opening portion of the outer cylinder 40 is welded (at the portion $D_2$) to the protecting member 53. According to the sensor housing 23 having the above arrangement, the inner cylinder 41 is welded to the body 21 beforehand, and then the pressure sensor 44 is incorporated in the inner cylinder 41. Therefore, the sensor 44 is not adversely affected by heat generated when the inner cylinder 41 is welded to the body 21. In addition, the semiconductor diaphragm 49 is remotely separated from the welding portions $D_1$ and $D_2$ and hence is advantageously less adversely affected by heat generated when these portions are welded. Furthermore, it is a matter of course that such a housing structure can be directly applied to the sensor housing 70 shown in FIG. 2.

Note that in the above embodiments, the description has been made with reference to the body 21 incorporating the central diaphragm 30. However, the present invention is not limited to the above embodiments, but can be applied to a body not incorporating the center diaphragm 30. In addition, it is a matter of course that the high pressure $P_H$ instead of the low pressure $P_L$ may be applied to the static pressure measuring pressure sensor 45.

As has been described above, according to the differential pressure transmitter of the present invention, since no pressure sensor is incorporated in the body, a structure of the body is significantly simplified, resulting in easy manufacture and assembly and a decrease in cost. In addition, the same body can be used in common for a transmitter performing static pressure measurement and that not performing it, so that types of body can be decreased and inventory control of parts can be easily performed. Furthermore, even when the pressure sensor malfunctions or is damaged, only the sensor housing need be replaced, i.e., the body need not be replaced.

What is claimed is:

1. An apparatus for measuring a pressure differential between two points as a process variate and simultaneously measuring a high or low static pressure which comprises:
    means for detecting and transmitting said pressure differential;
    a sensor housing detachably coupled to said detecting and transmitting means for converting said pressure differential into an electrical output wherein said sensor housing is detachably coupled to the upper surface of said detecting and transmitting means, said sensor housing comprising:
    an outer body containing a first and a second recess;
    a hollow inner concentric cylindrical body contained within said first recess of said outer body forming a first gap path between said first recess and said hollow inner cylindrical body wherein said first gap path contains said noncompressed liquid;
    means for converting said pressure differential into an electrical output contained within said hollow inner cylindrical body forming a second gap path between said converting means and said hollow inner cylindrical body wherein said second gap path contains said noncompressible liquid; and
    means for measuring a static pressure differential contained within said second recess of said outer body forming a third gap path between said means for measuring static pressure differential and said second recess wherein said third gap path contains said noncompressible liquid;
    whereby said first and said second gap paths communicate with said first said second sealing circuits of said detecting and transmitting means.

2. An apparatus according to claim 1, wherein said first gap path and said third gap path communicate through a communication path in said outer body of said sensor housing.

* * * * *